United States Patent

Titus et al.

[15] 3,674,912
[45] July 4, 1972

[54] CABLE CONNECTION FOR WATER COOLER UNDERGROUND ELECTRODE

[72] Inventors: Charles H. Titus, Newtown Square; Harold N. Schneider, Springfield, both of Pa.

[73] Assignee: General Electric Company

[22] Filed: Feb. 22, 1971

[21] Appl. No.: 117,488

[52] U.S. Cl. ............................... 174/15 C, 174/19, 174/20, 174/23 R, 174/47
[51] Int. Cl. ....................................................... H01b 7/34
[58] Field of Search ............... 174/15 C, 15 R, 16 B, 19, 20, 174/21 R, 23 R, 22 R, 68 C, 70 C, 47

[56] References Cited

UNITED STATES PATENTS

| | | | |
|---|---|---|---|
| 1,918,036 | 7/1933 | Hilliard | 174/23 R X |
| 2,175,749 | 10/1939 | Eckman | 174/19 |
| 3,171,889 | 3/1965 | McCarthy | 174/47 X |
| 3,098,892 | 7/1963 | Spade et al. | 174/15 C X |

Primary Examiner—Lewis H. Myers
Assistant Examiner—A. T. Grimley
Attorney—J. Wesley Haubner, Frank L. Neuhauser, Oscar B. Waddell and Joseph B. Forman

[57] ABSTRACT

A high power fluid cooled electric cable conduit is fixed in laterally offset axially overlapping relation to a fluid supply conduit with registering fluid passage ports in adjacent side walls thereof. The fluid supply conduit is closed at its overlapping end and an electric cable is introduced axially into the cable conduit through its overlapping end and in sealed relation therewith, the fluid supply ports being located between such overlapping ends of the conduits.

7 Claims, 2 Drawing Figures

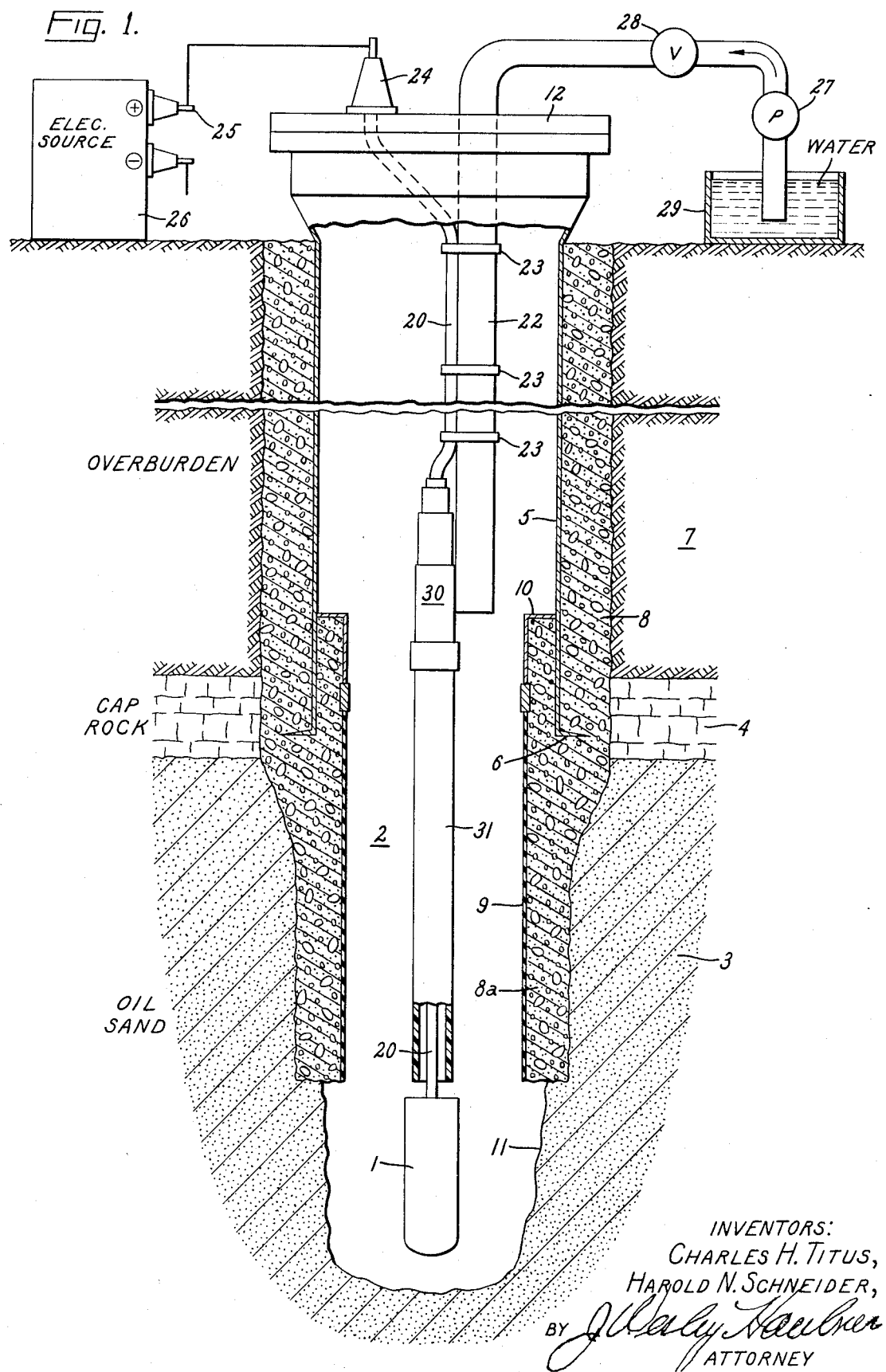

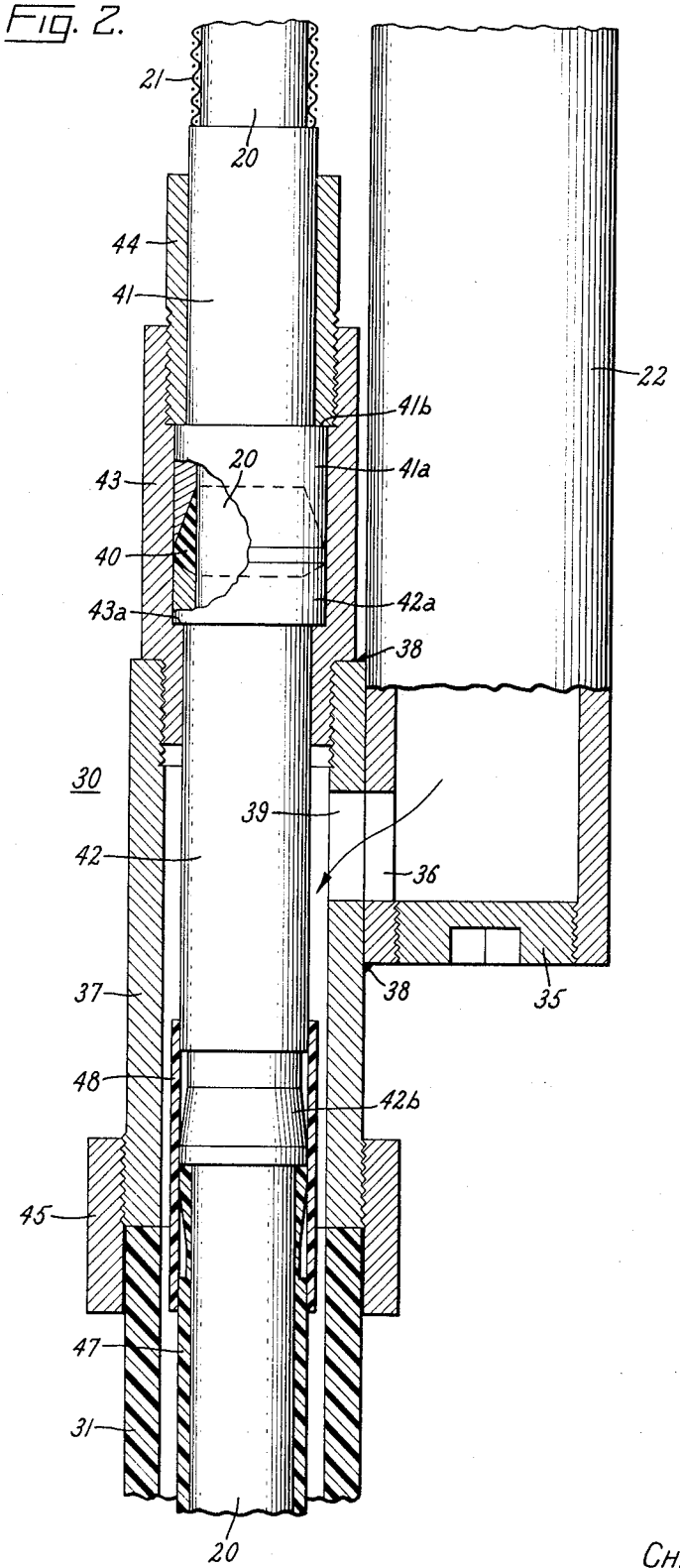

CABLE CONNECTION FOR WATER COOLER UNDERGROUND ELECTRODE

Our invention relates to electric cable and fluid supply connections to a water-cooled cable conduit, and particularly to a water-cooled cable conduit section immediately adjacent an underground high voltage electrode. The invention is especially applicable to connection of a high voltage, high current anode in apparatus for the conduction of electricity through ground, as in the treatment of oil-bearing earth strata in oil recovery operations.

Various electro-thermal techniques which involve the conduction of electric current through ground have been proposed heretofore to facilitate recovery of oil from underground oil-bearing formations. One such technique which comprehends high voltage and large current between spaced apart ground electrodes is illustrated in a copending application Ser. No. (48AV00552) filed on Nov. 12, 1970 by C. W. Bell and C. H. Titus and assigned to the same assignee as the present application. In that copending application there is disclosed, but not claimed, a cable connection especially suitable for use with a high voltage underground electrode which requires immersion in a moving stream of cooling fluid. The present application is directed to a combined cable and fluid conduit connection having particular application to such an underground electrode.

It is a general object of this invention to provide improved means for connecting electric cable and fluid conduit to a conduit section enclosing both cable and fluid.

It is another object of my invention to provide a combined electric and fluid conduit connection to a high voltage electrode remotely located underground.

In carrying out our invention in a preferred embodiment, I suspend a high voltage ground electrode in a deep bore hole which penetrates an oil-bearing formation far below the surface of the earth. The electrode is suspended at the lower end of an electric power supply cable and is provided with cooling fluid through a water conduit which extends into the bore hole in juxtaposition to the cable. Because of the great weight of cable in a deep bore hole it is necessary to relieve strain on the cable by intermediate supports along its length. This is most conveniently done by strapping the cable to the outside of the water conduit for most of its length, but in the region near the electrode it is desirable to carry the cable and water in a common conduit. To this end the separate water pipe is closed at its lower end near the electrode, as at a distance of several feet or yards above it, and is apertured at one side. A second apertured length of pipe is juxtaposed in axially parallel overlapping side by side relation with the apertures in registry, thereby to provide an offset lower section of the fluid conduit. The electric cable is introduced concentrically into the upper end of the offset conduit section so that the offset section houses both the electric cable and the cooling fluid. A lower portion of the offset conduit section has an internal diameter appreciably larger than the cable to provide an annular fluid passage therebetween and is preferably formed of insulating tubing.

Our invention will be more fully understood and its several objects and advantages further appreciated by referring now to the following detailed specification taken in conjunction with the accompanying drawing in which:

FIG. 1 is a foreshortened cross sectional view of a bore hole through the earth containing a fluid conduit and cable assembly embodying my invention and showing particularly the lower end of the bore hole, and FIG. 2 is an enlarged fragmentary cross-sectional view of the conduit cross-over connection where the electric cable enters the fluid conduit.

Referring now to the drawing, we have shown a high voltage electrode 1 suspended in a deep bore hole 2 which penetrates an oil-bearing formation 3 beneath the surface of the earth. Typically the formation 3 lies beneath a layer of cap rock 4. The bore hole 2 may extend several hundreds or thousands of feet into the earth and is lined for most of its length with an elongate metal tube or casing 5 the lower end of which is terminated by a shoe 6 disposed at approximately the same elevation as the cap rock 4. In a manner well known to those skilled in the art the tubular casing 5 is sealed in the earth overburden 7 by an external annular layer 8 of concrete. Near the bottom of the bore hole 2 a tubular liner 9 of insulating material (e.g., an epoxy resin) extends from the tubular metallic casing 5 for an appreciable distance into the oil-bearing formation 3. The insulating liner 9 is telescopically joined to the metallic casing 5 by means of an offset annular coupling 10. The space between the exterior wall of the insulating liner 9 and the surrounding oil sand 3 is packed with high temperature concrete 8a. Although shown out of scale at FIG. 1 to simplify the drawing, it will be evident to those skilled in the art that the liner 9 may be of considerable length and of relatively small internal diameter. The electrode 1 is positioned in a cavity 11 formed in the oil sand 3 immediately beneath the lower end of the insulating liner 9. The bore hole 2 is closed at the top by a closure cap 12 sealed to the liner 5.

The anode 1 is suspended in the cavity 11 at the lower end of an insulated electric conductor or cable 20 which is preferably provided for most of its length with an external metallic armor sheath 21 (FIG. 2). Extending centrally through substantially the full length of the bore hole 2 and in annular spaced relation with the casing 5 there is provided also a tubing string 22 which constitutes a fluid conduit. As is well known to those skilled in the art the tubing string 22 is ordinarily formed of a plurality of metallic pipe sections coupled in end-to-end relation. The insulated cable 20 is fixed externally to the conduit 22 from a point below the cap 12 at ground level to a point slightly above the liner coupling 10, as by a plurality of clamps 23. Both the cable 20 and the fluid conduit 22 emerge from the bore hole 2 through suitable sealed apertures in the cap 12. At its point of emergence the cable 20 is connected through an insulating bushing 24 on the cap 12 to the positive terminal 25 of a suitable source 26 of high voltage unidirectional current supply. Above ground the fluid conduit 22 is connected through a shut off valve 28 to the outlet of a pump 27. The inlet of pump 27 communicates with a source of fluid supply shown as a water reservoir 29. In the lower region of the bore hole 2, and particularly in that section provided with the insulating liner 9, it is desirable that the fluid conduit be formed of insulating material and that the cable 20 be carried concentrically through the insulating section of fluid conduit in annular spaced relation with the conduit. For this purpose I provide immediate above the liner coupling 10 (which connects the metallic casing 5 to the insulating liner 9) an offset or crossover conduit section 30 which is illustrated in detail at FIG. 2. Below the crossover conduit section 30 there is coupled a tubular conduit section 31 formed of insulating material (e.g., fiberglas tubing). The cable 20 is introduced axially into the crossover section 30 and passes axially through the insulating conduit section 31 in annular spaced relation therewith. Through the crossover conduit section 30 cooling fluid from the tubing string 22 is also introduced into the insulating conduit section 31. The conduit sections 30 and 31 thus serve as combined fluid and electric conduit.

Below the lower end of the insulating conduit section 31 the electric cable 20 is connected to the anode electrode 1. In operation cooling water flowing from the open lower end of the conduit section 31 fills the cavity 11 and serves as a conductor to form an electrical connection between the anode 1 and the surrounding formation 3.

The crossover conduit section 30 is illustrated in enlarged cross sectional view at FIG. 2. This crossover section has purpose of providing endwise axial entry into the conduit section 31 of both the electric cable 20 and fluid from the tubing string 22.

As shown at FIG. 2 the metallic tubing string 22, i.e., the upper fluid conduit section, is closed at the bottom end by a plug 35 and is laterally apertured at 36 adjacent the plug. An offset short section of metal pipe or tubing 37 is affixed to one side of the conduit section 22 in laterally offset and axially overlapping relation, as by welds 38 between the offset pipe sections. The short crossover tube or offset pipe section 37 is open at both ends and laterally apertured at 39, the pipe sections 22 and 37 being so juxtaposed laterally that the apertures 36 and 39 are in registry, thereby to provide ports for passage of cooling fluid transversely from the pipe section 22 into the offset crossover tube 37.

The electric cable 20 enters axially into the crossover tube 37 at its upper end through a sealed bushing comprising an annular rubber gasket 40 axially compressed between axially juxtaposed ends of a pair of clamping members 41, 42. The clamping members 41, 42 are tubular metallic sleeves loosely disposed upon the cable 20 in end to end relation and having radially enlarged heads 41a and 42a, respectively, in axial juxtaposition. The internal surfaces of the clamping heads 41a, 42a are tapered and embrace the annular gasket 40. The clamping heads are disposed within a tubular coupling sleeve 43 which is threaded axially into the upper end of the crossover tube 37 and provides an internal shoulder 43a upon which the lower clamping head 42a is seated. The clamping sleeve 41 and its head 41a are slidable within the coupling sleeve 43 and the head 41a is compressed against the gasket 40 by a sleeve 44 threaded into the sleeve 43 and bearing upon an upper shoulder 41b of the clamping head 41a. To ensure good sealing of the gasket 40 against the cable 20 the external metallic armor 21 of the cable is removed at the point where it enters the clamping sleeve 41. The cable insulation, however, is left on that portion of the cable which passes through the clamping sleeves 41 and 42 and these sleeves thus serve also as external cable support and armor for that portion of the cable passing through the bushing and the crossover tube 37. The clamping sleeve 42 thus extends axially downward beyond the fluid apertures 36, 39 and protects the cable from damage by water flowing laterally into the tube 37.

At its lower end the metal crossover tube 37 is coupled to the insulating conduit 31 by means of an annular coupling 45. The coupling 45 is threadedly connected to the metal tube 37 and cemented to the insulating tube 31. Preferably the crossover tube 37 and the conduit section 31 have the same internal and external diameters as shown at FIG. 2.

In the region where the electric cable 20 enters the conduit coupling 45, the metal clamping sleeve 42 is reversely tapered at its lower end, as at 42b. Below this point the cable 20 is enclosed in a snuggly fitting sheath 47 formed of rigid insulating material, thereby to insulate or additionally insulate the conductor and protect it mechanically in its passage through the insulating conduit section 31. As shown at FIG. 2 the insulating sheath 47 is reversely tapered at its upper end and is in abutting relation at this end with the reversely tapered end 42b of the clamping sleeve 42. Over these abutting ends there is slipped a short tubular coupling 48 of insulating material, such as a sleeve of epoxy resin. Desirably this sleeve is cemented in place to both the cable insulation 46 and the insulating sleeve 47, as by filling the oppositely tapered abutting end spaces with a suitable epoxy cement (not shown).

It will now be evident to those skilled in the art that our conduit crossover connection provides convenient and effective means for introducing both an electric cable and cooling fluid axially into a conduit section, such as the section 31, in such manner that the electric conductor is electrically insulated and mechanically protected by the conduit section while the cooling fluid circulates evenly throughout the annular space between the conduit and the conductor.

While we have shown only a preferred embodiment of our invention by way of illustration, many modifications will occur to those skilled in the art, and we, therefore, wish to have it understood that we intend in the appended claims to cover all such modifications as fall within the true spirit and scope of our invention.

What we claim as new and desire to secure by Letters Patent of the United States is:

1. A fluid cooled electric cable conduit assembly comprising a tubular conduit section having a lateral aperture adjacent one end, an electric cable extending axially through said conduit section in concentric annularly spaced relation, fluid sealing means between said cable and said conduit section at said one end thereof, and fluid supply means connected to supply cooling fluid through said aperture.

2. A cable conduit assembly according to claim 1 wherein said fluid supply means comprises a second tubular conduit having one end fixed to said tubular conduit section in laterally offset axially overlapping relation and having a lateral aperture adjacent and in registry with the aperture in said tubular conduit section, and closure means at said one end of said second tubular conduit 3. A cable conduit assembly according to claim 2 wherein said electric cable extends along the outside of said second tubular conduit and is mechanically supported thereon.

4. A fluid conduit assembly comprising a pair of tubular conduit sections secured together in laterally offset axially overlapping relation, said conduit sections having fluid passage ports in registry in adjacent side walls thereof, closure means at the overlapped end of one said conduit section axially beyond said ports in one direction, an electric cable axially disposed in annular spaced relation in the other said conduit section, said cable entering said other conduit section axially through the overlapped end thereof, and fluid sealing means between said cable and said other conduit section disposed axially beyond said ports in the other direction.

5. A fluid conduit assembly according to claim 4 including a tubular metallic sheath encasing said electric cable adjacent said fluid passage ports.

6. A fluid conduit assembly according to claim 4 wherein said fluid sealing means includes a tubular clamping sleeve encasing said electric cable in the region adjacent said fluid passage ports.

7. A high power fluid cooled electric cable conduit assembly comprising a first tubular conduit section having a fluid entry port in a side wall thereof adjacent one end, a second tubular conduit section of insulating material coupled to the other end of said first section in axial alignment therewith, and insulated electric cable entering said one end of said first conduit section and traversing both said sections in axially aligned annularly spaced relation therewith, sealed bushing means between said cable and said first conduit section, and a fluid supply conduit fixed to said first tubular conduit section in overlapping relation with said one end thereof and extending in laterally offset parallel relation thereto, said fluid supply conduit having a lateral fluid supply port in registry with said entry port thereby to supply cooling fluid between said cable and said tubular conduit sections.

* * * * *